United States Patent [19]

Takahashi et al.

[11] Patent Number: 4,783,668
[45] Date of Patent: Nov. 8, 1988

[54] THERMAL PRINTING APPARATUS

[76] Inventors: Toshinori Takahashi, No. 386-2, Imainaka-Cho, Nakahara-Ku, Kawasaki-Shi, Kanagawa-Ken; Hideshi Tanaka, No. 15-30, Nagahama, Kanazawa-Ku, Yokohama-Shi, Kanagawa-Ken, both of Japan

[21] Appl. No.: 849,495

[22] Filed: Apr. 8, 1986

[30] Foreign Application Priority Data

Apr. 12, 1985 [JP] Japan .................................. 60-77761

[51] Int. Cl.⁴ .......................................... G01D 15/16
[52] U.S. Cl. .................. 346/76 PH; 219/216
[58] Field of Search .................... 346/76 PH; 219/216

[56] References Cited

U.S. PATENT DOCUMENTS 4,355,319 10/1982 Takeuchi et al. ............. 346/76 PH
4,399,749  8/1983 Arai ................................... 101/211
4,532,523  7/1985 Tanaka ........................... 346/76 PH
4,563,691  1/1986 Noguchi et al. ............... 346/76 PH Primary Examiner—E. A. Goldberg
Assistant Examiner—Gerald E. Preston

[57] ABSTRACT

A thermal printing apparatus comprises a thermal printing head comprising heating elements which are applied with a constant current depending on printing data. One picture element is printed by use of at least two heating elements. Time periods in which heating times of the heating elements are controlled are time divisionally assigned depending on the gradation so that a time period in which the heating time of a certain heating element is controlled partly overlaps a time period in which the heating time of another heating element is controlled.

7 Claims, 4 Drawing Sheets

THERMAL PRINTING APPARATUS

BACKGROUND OF THE INVENTION

The present invention generally relates to thermal printing apparatuses, and more particularly to a thermal printing apparatus which prints with a desired gradation by controlling application times of a constant current applied to heating elements of a thermal printing head.

Generally, a thermal printing apparatus employs a polyester ink film which has a thickness of approximately five to six microns and has one surface thereof coated with a kind of ink which melts when heated. The ink film is provided so that a first surface thereof coated with the ink opposes a recording sheet, and a thermal printing head comprising heating elements is arranged so as to oppose a second surface of the ink film not coated with the ink. When the thermal printing head makes contact with the second surface of the ink film and a current is applied to the heating elements of the thermal printing head, those heating elements applied with the current are heated, and the ink coated on the ink film is melted at positions corresponding to the heating elements which are heated so as to transfer the melted ink onto the recording sheet. Usually, the thermal printing head comprises a plurality of heating elements which are arranged in-line, and the current is successively applied to the heating elements depending on printing data. An image such as characters, figures, picture and the like is printed on the recording sheet by the heating elements which print dots on the recording sheet.

The gradation of the image printed on the recording sheet is determined by the areas of the dots which are printed by the heating elements. The area of each dot is determined by the magnitude of the current applied to each heating element, or by an application time of a constant current applied to each heating element. The heat generated by the heating element increases as the magnitude of the current applied thereto increases or as the application time of the constant current applied thereto increases, and the area of the printed dot accordingly increases. Hence, it is possible to control the gradation of the printing by controlling the application time of the constant current applied to each heating element, that is, by controlling the the heating time of each heating element.

In a conventional thermal printing apparatus which prints one picture element of an image by use of one heating element, when the relationship between the application time of the current applied to the heating element and the density of the dot printed by the heating element is plotted to obtain a graph, it can be seen from the graph that a time period in which the melting quantity of the ink greatly changes is extremely short and the density of the dot rapidly changes within this extremely short time period. For this reason, in order to carry out the printing with a large number of gradation levels, it is necessary to assign a large number of gradation levels within the extremely short time period, and it is extremely difficult to carry out the printing with a large number of gradation levels.

Accordingly, it is possible to conceive a thermal printing apparatus which prints one picture element of the image by use of two heating elements, for example. In this case, compared to the case where one picture element is printed by use of one heating element, it is possible to carry out the printing with a larger number of gradation levels. However, when the current is applied to a first one of the two heating elements and the current is thereafter applied in succession to a second one of the two heating elements, the rate with which the density of the printed picture element changes does not become constant with respect to the application time of the current. Therefore, as will be described later on in the present specification, there is a problem in that it is difficult to control the gradation of the printing.

SUMMARY OF THE INVENTION

Accordingly, it is a general object of the present invention to provide a novel and useful thermal printing apparatus in which the problems described heretofore are eliminated.

Another and more specific object of the present invention is to provide a thermal printing apparatus in which a constant current is applied to heating elements depending on printing data and time periods in which heating times of the heating elements are controlled are time divisionally assigned depending on the gradation so that a time period in which the heating time of a certain heating element is controlled partly overlaps a time period in which the heating time of another heating element is controlled. According to the thermal printing apparatus of the present invention, it is possible to carry out the printing with a larger number of gradation levels compared to a conventional thermal printing apparatus which prints one picture element by use of one heating element. In addition, it is possible to easily and accurately control the gradation of the printing because a rate with which the density of a printed picture element changes can be made constant with respect to the application time of the current applied to the heating elements.

Still another object of the present invention is to provide a thermal printing apparatus in which the heating times of the certain and the other heating elements are alternately controlled during a mutually overlapping time period of the respective time periods in which the heating times of the certain and the other heating elements are controlled. According to the thermal printing apparatus of the present invention, it is possible to make the rate with which the density of the printed picture element changes constant with respect to the application time of the current applied to the heating elements.

A further object of the present invention is to provide a thermal printing apparatus which comprises a plurality of heating element groups each comprising a plurality of heating elements for printing one picture element, wherein heating times of the heating elements in $(2n+1)$-th heating element groups are controlled when printing an odd (or even) line and heating times of the heating elements in $2n$-th heating element groups are controlled when printing an even (or odd) line, where n is a natural number including zero. According to the thermal printing apparatus of the present invention, it is possible to obtain a clear contrast because there are portions in each line where the dot is not printed, that is, left blank.

Other objects and further features of the present invention will be apparent from the following detailed description when read in conjunction with the accompanying drawings.

DETAILED DESCRIPTION

Figure 1:
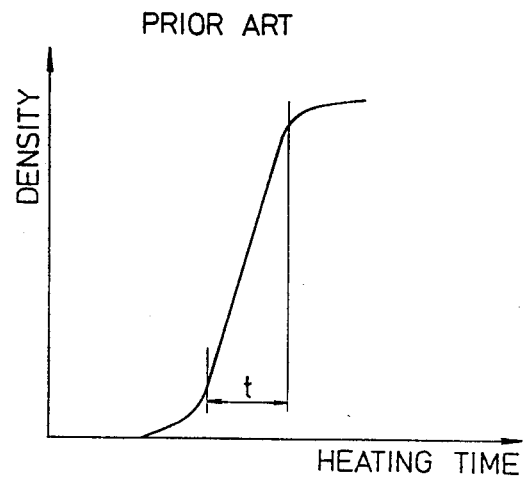
FIG. 1 is a graph showing a heating time versus printing density characteristic of a heating element in a conventional thermal printing apparatus.
Figure 2:
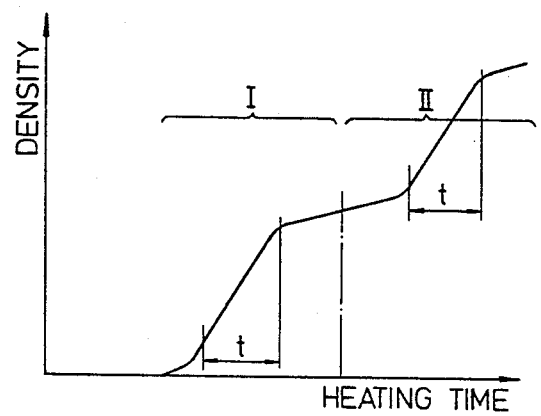
FIG. 2 is a graph showing a heating time versus printing density characteristic of heating elements in a conceivable thermal printing apparatus.
Figure 3:
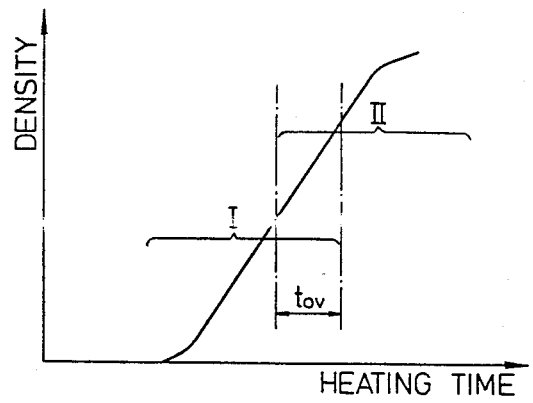
FIG. 3 is a graph showing a heating time versus printing density characteristic of heating elements in the thermal printing apparatus according to the present invention.

FIGS. 1 through 3 respectively show heating time versus printing density characteristics of heating elements when a current is applied thereto.

FIG. 1 shows the characteristic of the heating element in a conventional thermal printing apparatus which prints one picture element by use of one heating element. It can be seen from FIG. 1 that a time period t in which the melting quantity of the ink greatly changes is extremely short and the printing density rapidly changes in this extremely short time period t. In the conventional thermal printing apparatus, there is a problem in that it is extremely difficult to carry out the printing with a large number of gradation levels because it is difficult to assign a large number of gradation levels within the extremely short time period t.

It is possible to conceive a thermal printing apparatus which prints one picture element by use of two heating elements which are arranged side by side, for example. FIG. 2 shows the characteristic of the heating elements in this conceivable thermal printing apparatus. Compared to the case where one picture element is printed by use of one heating element, it is possible to carry out the printing with a larger number of gradation levels. However, when the current is applied to a first one of the two heating elements in a time period I and the current is thereafter applied to a second one of the two heating elements in a time period II, the rate with which the density of the printed picture element changes does not become constant with respect to the application time of the current. Therefore, there is a problem in that it is difficult to control the gradation of the printing.

FIG. 3 shows the characteristic of the heating elements in the thermal printing apparatus according to the present invention. As may be seen from FIG. 3, the time period I in which the current is applied to the first heating element and the time period II in which the current is thereafter applied in succession to the second heating element have an overlapping time period tov, so that the rate with which the printing density changes becomes constant with respect to the applying time of the current applied to the heating elements, that is, with respect to the heating time of the heating elements.

Figure 4:
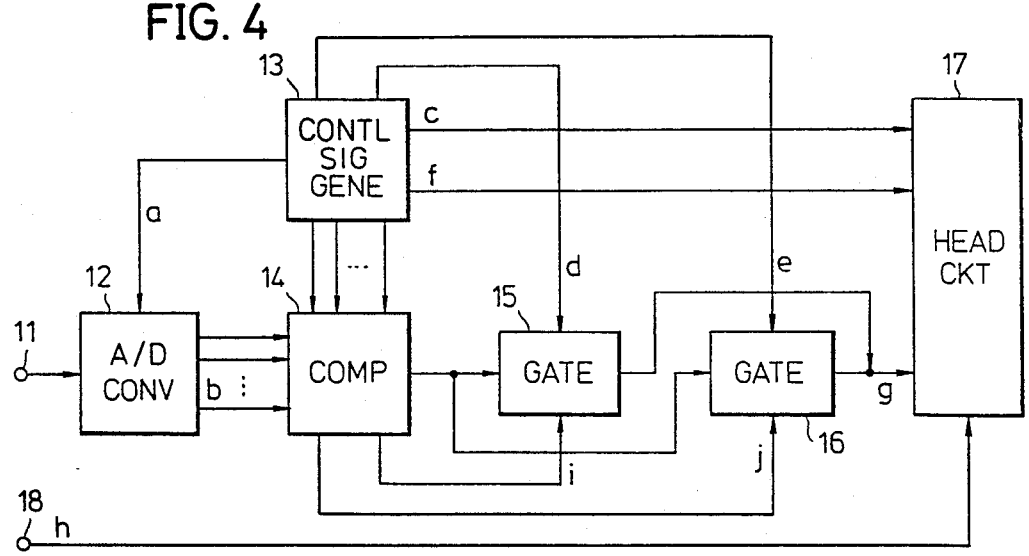
FIG. 4 is a system block diagram showing an embodiment of the thermal printing apparatus according to the present invention.

FIG. 4 shows an embodiment of the thermal printing apparatus according to the present invention. For convenience' sake, description will be given with respect to the case where one picture element is printed by use of two heating elements. An analog picture signal is applied to an input terminal 11 and is supplied to an analog-to-digital (A/D) converter 12. The analog picture signal is converted into digital datum b having a timing shown in FIG. 5(B) by a clock pulse signal a shown in FIG. 5(A) which is obtained from a control signal generating circuit 13. The digital datum b is supplied to a comparing circuit 14 as a parallel gradation datum b. On the other hand, a reference comparison datum which has a constant period and successively increases in value depending on a count is obtained from the control signal generating circuit 13 and is supplied to the comparing circuit 14. The comparing circuit 14 compares the gradation datum b from the A/D converter 12 and the reference comparison datum from the control signal generating circuit 13 and produces a serial gradation control datum having a level "1" when the gradation datum b is greater than the reference comparison datum and having a level "0" in other cases.

Figure 5:
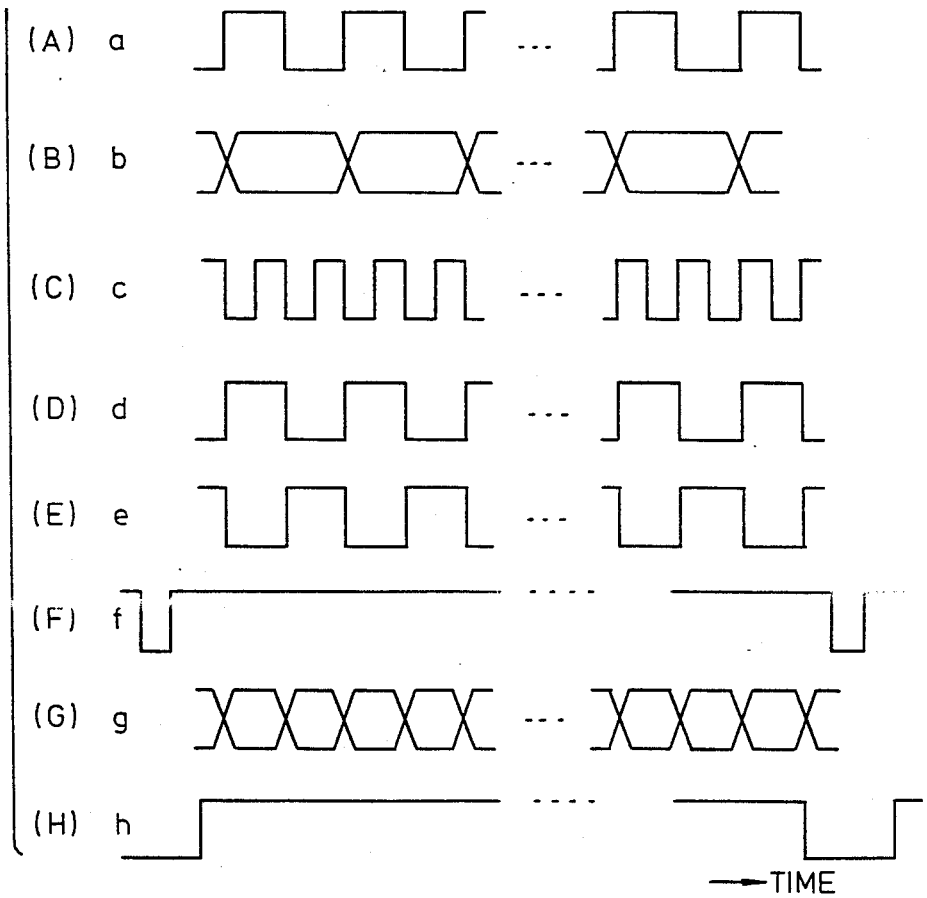
FIGS. 5(A) through 5(H) show signal waveforms for explainig g the operation of the block system shown in FIG. 4.
Figure 6:
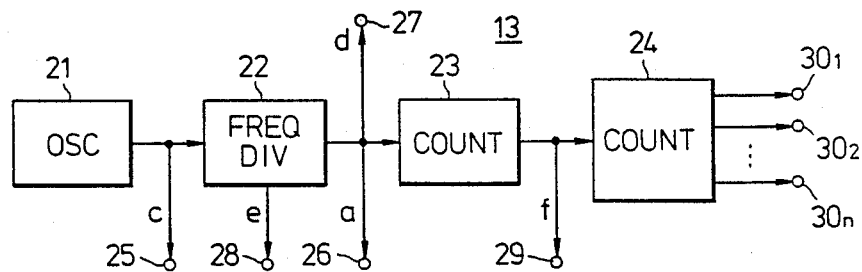
FIG. 6 is a system block diagram showing an embodiment of a control signal generating circuit within the block system shown in FIG. 4.

The control signal generating circuit 13 has a construction shown in FIG. 6. The control signal generating circuit 13 comprises an oscillator 21 which is a generally available chip 74S124 or the like, a ½-frequency divider 22 and counters 23 and 24. The oscillator 21 generates a clock pulse signal c shown in FIG. 5(C), and this clock pulse signal c is supplied to the ½-frequency divider 22 and an output terminal 25. The clock pulse signal c from the output terminal 25 is supplied to a thermal head circuit 17 shown in FIG. 4 which will be described later. The ½-frequency divider 22 frequency-divides the clock pulse signal c by ½ and supplies a gate signal d shown in FIG. 5(D) to the counter 23 and output terminals 26 and 27. The gate signal d from the output terminal 26 is supplied to the A/D converter 12 shown in FIG. 4 as the clock pulse signal a described before, and the gate signal d from the output terminal 27 is supplied to a gate circuit 15 shown in FIG. 4 which will be described later. The ½-frequency divider 22 also produces a gate signal e shown in FIG. 5(E) which is an inverted signal of the gate signal d, and the gate signal e is supplied to an output terminal 28. The gate signal e from the output terminal 28 is supplied to a gate circuit 16 shown in FIG. 4 which will be described later. The counter 23 counts a predetermined number of pulses in the gate signal d and supplied a clock pulse signal f shown in FIG. 5(F) to the counter 24 and an output terminal 29. The clock pulse signal f from the output terminal 29 is supplied to the thermal head circuit 17. The counter 24 counts pulses in the clock pulse signal f and successively produces a reference comparison datum corresponding to the counted gradation level. The reference comparison datum produced from the counter 24 is outputted via output terminals $30_1$ through $30_n$ and is supplied to the comparing circuit 14 shown in FIG. 4. For example, a generally available chip 74LS161 or the like may be used for the counters 23 and 24.

The serial gradation control datum from the comparing circuit 14 is supplied to the gate circuits 15 and 16. The gate circuits 15 and 16 are respectively supplied with the gate signals d and e described before which are obtained from the control signal generating circuit 13. When it is assumed that the gradation level changes from 1, ..., L, ..., M, ..., N, the comparing circuit 14 supplies to the gate circuit 15 a gate circuit control pulse signal i shown in FIG. 7(A) which has a high level when the gradation level is in the range of 1 to M, and supplies to the gate circuit 16 a gate circuit control pulse signal j shown in FIG. 7(B) which has a high level when the gradation level is in the range of L to N. Accordingly, the gate circuit 15 intermittently supplies the serial gradation datum from the comparing circuit 14 to the thermal head circuit 17 responsive to the gate signal d during the time period in which the gradation level is in the range of 1 to M. On the other hand, the gate circuit 16 intermittently supplies the serial gradation datum from the comparing circuit 14 to the thermal head circuit 17 responsive to the gate signal e during the time period in which the gradation level is in the range of L to N. As a result, A gradation control datum g is supplied to the thermal head circuit 17 with a timing shown in FIG. 5(G). Since the gate signals d and e are obtained by frequency-dividing the clock pulse signal c by ½, the gradation control datum g obtained from the gate circuits 15 and 16 is supplied to the thermal head circuit 17 at a rate of one datum for two pulses of the clock pulse signal c.

Figure 8:
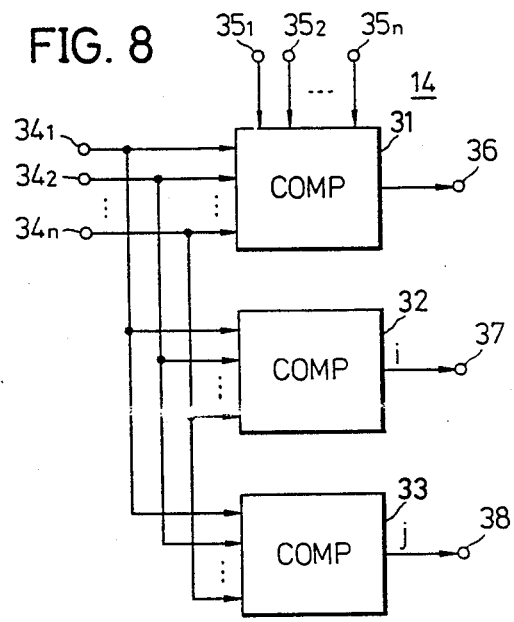
FIG. 8 is a system block diagram showing an embodiment of a comparing circuit within the block system shown in FIG. 4.

The comparing circuit 14 has a construction shown in FIG. 8. The comparing circuit 14 comprises comparators 31, 32 and 33. The reference comparison datum from the control signal generating circuit 13 is applied to input terminals $34_1$ through $34_n$ and is supplied to the comparators 31 through 33. The gradation datum b from the A/D converter 12 is applied to input terminals $35_1$ through $35_n$ and is supplied to the comparator 31. The comparator 31 obtains a serial gradation datum by comparing the reference comparison datum from the input terminals $34_1$ through $34_n$ and the gradation datum from the input terminals $35_1$ through $35_n$, and supplies the serial gradation datum to an output terminal 36. The serial gradation datum from the output terminal 36 is supplied to the gate circuits 15 and 16 shown in FIG. 4. The comparator 32 obtains the gate circuit control pulse signal i by comparing a preset datum M and the reference comparison datum, and supplies the gate circuit control pulse signal i to an output terminal 37. The comparator 33 obtains the gate circuit control pulse signal j by comparing a preset datum L and the reference comparison datum, and supplies the gate circuit control pulse signal j to an output terminal 38. The gate circuit control pulse signals i and j from the respective output terminals 37 and 38 are supplied to the gate circuits 15 and 16, respectively. For example, a generally available chip 74LS682 or the like may be used for the comparators 31 through 33.

For example, a switching pulse signal h shown in FIG. 5(H) which has a high level for the duration of the analog picture signal applied to the input terminal 11 is applied to an input terminal 18. This switching pulse signal h is supplied to the thermal head circuit 17.

Figure 9:
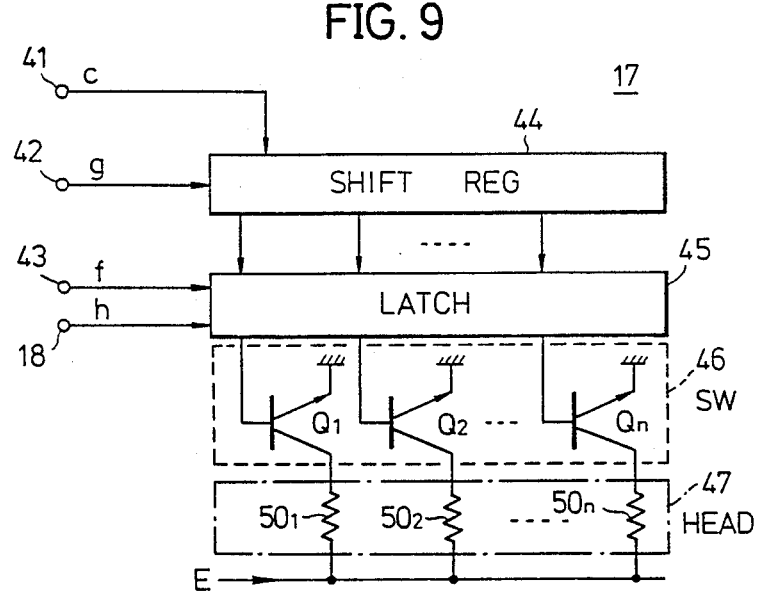
FIG. 9 is a system circuit diagram showing an embodiment of a thermal head circuit within the block system shown in FIG. 4.

The thermal head circuit 17 has a construction shown in FIG. 9. The thermal head circuit 17 generally comprises a shift register 44, a latch circuit 45, a switching circuit 46 comprising transistors Q1 through Qn, and a thermal printing head 47 comprising heating elements (heating resistors) $50_1$ through $50_n$. The shift register 44, the latch circuit 45 and the switching circuit 46 constitute a head driving circuit.

The gradation control datum g is supplied to the shift register 44 via an input terminal 42 and is successively shifted in the shift register 44 responsive to the clock pulse signal c obtained via an input terminal 41. The datum entered into the shift register 44 is supplied to the latch circuit 45, and the latch circuit 45 latches the datum from the shift register 44 responsive to the clock pulse signal f obtained via an input terminal 43. The latch circuit 45 is also supplied with the switching pulse signal h from the input terminal 18. Accordingly, predetermined transistors out of the transistors Q1 through Qn are turned ON during the high level period of the switching pulse signal h depending on the latched datum. Thus, a constant current is applied to those heating resistors which are coupled to the transistors which are turned ON and the heating resistors applied with the current are heated. In FIG. 9, E denotes a power source voltage. In addition, one picture element is printed by use of the heating resistors $50_1$ and $50_2$ and other picture elements are similarly printed by use of a pair of heating resistors.

Figure 7:
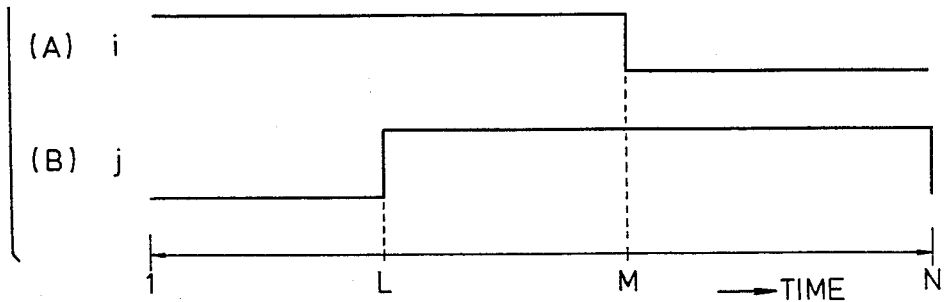
FIGS. 7(A) and 7(B) are timing charts for explaining the operation of the block system shown in FIG. 4.

When the gradation level changes from 1, ..., L, ..., M, ..., N as described before, it may be readily understood from the description given in conjunction with FIGS. 7(A) and 7(B) that, for example, only the heating resistor $50_1$ is controlled for the gradation levels of 1 to L, the heating resistors $50_1$ and $50_2$ are alternately controlled for the gradation levels of L to M and only the heating resistor $50_2$ is controlled for the gradation levels of M to N.

The illustrations of the ink film and the recording sheet are omitted in FIGS. 4 and 9. The positional relationship of the thermal printing head comprising heating resistors, the ink film and the recording sheet is known from FIG. 1 of the U.S. Pat. No. 4,532,523, for example.

According to the present embodiment, it is possible to carry out the printing with a large number of gradation levels because two heating resistors are used to print one picture element. Furthermore, for the gradation levels of 1, ..., L, ..., M, ..., N, the heating times of the two heating resistors are alternately controlled for the gradation levels of L to M, that is, the time period in which one heating resistor is controlled and the time period in which the other heating element is controlled mutually overlap for a specific time period. As a result, the rate with which the printing density changes becomes constant with respect to the heating time of the heating resistors as shown in FIG. 3, and it is possible to easily and accurately control the gradation compared to the case shown in FIG. 2.

In the embodiment described heretofore, two heating resistors are used to print one picture element. However, it is of course possible to use more than two heating resistors to print one picture element.

Figure 10:
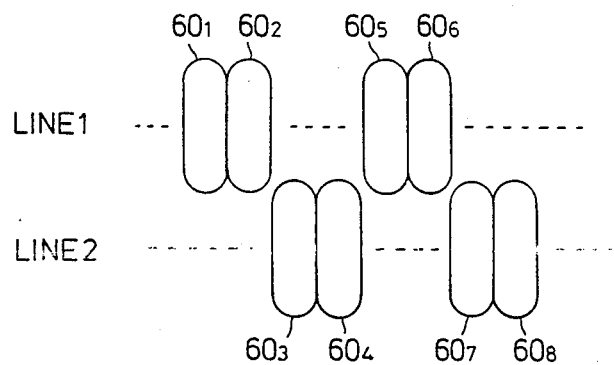
FIG. 10 is a diagram for explaining another embodiment of the thermal printing apparatus according to the present invention.

Next, description will be given with respect to a second embodiment of the thermal printing apparatus according to the present invention by referring to FIG. 10. In the present embodiment, the thermal head circuit has the same construction as the thermal head circuit shown in FIG. 17, and the thermal printing head comprises a plurality of heating resistor groups each comprising a plurality of heating elements. The heating times of the heating resistors in $(2n+1)$-th heating resistor groups are controlled when printing an odd (or even) line and heating times of the heating resistors in $2n$-th heating resistor groups are controlled when printing an even (or odd) line, where n is a natural number including zero.

According to the present embodiment, the gradation control datum for the $(2n+1)$-th heating resistor groups and zero datum for the $2n$-th heating resistor groups are supplied serially to the shift register 44 shown in FIG. 9 when printing an odd line, for example. As a result, in a first line shown in FIG. 10, the heating resistors in the $(2n+1)$-th heating resistor groups are used to print dots $60_1$, $60_2$, $60_5$ and $60_6$. Next, in a second line, the heating resistors in the $2n$-th heating resistor groups are used to print dots $60_3$, $60_4$, $60_7$ and $60_8$. Hence, it is possible to obtain a clear contrast regardless of the gradation of printing because there are portions in each line where the dot is not printed, that is, left blank.

It is possible to divide the gradation levels into odd and even gradation levels, and use only the odd or even gradation levels when printing. In addition, it is possible to print the odd (or even) lines with the odd gradation levels and print the even (or odd) lines with the even gradation levels.

As is evident from the description given heretofore, the present invention is especially effective when the number of heating elements used to print one picture element is limited.

Further, the present invention is not limited to these embodiments, but various variations and modifications may be made without departing from the scope of the present invention.

What is claimed is:

1. A thermal printing apparatus comprising:
   an input terminal supplied with an analog picture signal; analog-to-digital converting means for converting said analog picture signal into a parallel digital gradation datum;
   signal generating means for generating a reference comparison datum which has a constant period and successively increases in value;
   comparing means comprising n comparators, where n is larger than or equal to two, each of said n comparators comparing said digital gradation datum and said reference comparison datum for producing output signals in accordance with a result of the comparison;
   gate means for time divisionally and selectively passing said output signals of said n comparators to produce a serial datum; and
   thermal head circuit means supplied with said output serial datum of said gate means;
   said thermal head circuit means comprising a thermal printing head and head driving means for controlling application of a constant current to said thermal printing head depending on the output serial datum of said gate means, said thermal printing head comprising n heating elements, one picture element being printed by use of said n heating elements,
   said gate means time divisionally and selectively passing said output signals of said n comparators to said n heating elements so that a time period in which the constant current is applied to one of said n heating elements partly overlaps a time period in which the constant current is applied to another of said n heating elements.

2. A thermal printing apparatus as claimed in claim 1 in which the output digital gradation datum of said analog-to-digital converting means has gradation levels of 1 to N, said gate means time divisionally and selectively passing the output signals of the comparators so that the constant current is applied to said one heating element for the gradation levels of 1 to L, where L is greater than 1 but less than N, the constant current is applied to said one heating element and said other heating element for the gradation levels of L to M, where M is greater than L but less than N, and the constant current is applied to said other heating element for the gradation levels of M to N.

3. A thermal printing apparatus as claimed in claim 1 in which said signal generating means generates gate signals for controlling said gate means.

4. A thermal printing apparatus as claimed in claim 3 in which said signal generating means further generates clock pulse signals which are supplied to said analog-to-digital converting means and said thermal head circuit means to control operating timings thereof.

5. A thermal printing apparatus as claimed in claim 1 in which said thermal printing head comprises a plurality of heating elements groups each comprising a plurality of heating elements, said gate means supplies the output serial datum thereof to said thermal head circuit so that only $(2i-1)$-th heating element groups are used to print an odd line and only $2i$-th heating element groups are used to print an even line or vice versa, where i is a positive integer.

6. A thermal printing apparatus as claimed in claim 1 in which the output digital gradation datum of said analog-to-digital converting means has odd and even gradation levels, said gate means supplies the output serial datum thereof to said thermal head circuit so that an odd line is printed with the odd gradation levels and an even line is printed with even gradation levels or vice versa.

7. A thermal printing apparatus as claimed in claim 1 in which said head driving means of said thermal head circuit means comprises a shift register supplied with the output serial datum of said gate means, a latch circuit for latching an output of said shift register, and a switching circuit for supplying the constant current to the heating elements depending on a datum latched by said latch circuit for a duration of said analog picture signal so as to control heating times thereof.

* * * * *

UNITED STATES PATENT AND TRADEMARK OFFICE
CERTIFICATE OF CORRECTION

PATENT NO. : 4,783,668

DATED : November 8, 1988

INVENTOR(S) : Toshinori Takahashi et al

It is certified that error appears in the above-identified patent and that said Letters Patent is hereby corrected as shown below:

Title page, item [73], insert -- Victor Company of Japan, Ltd., Kanagawa-Ken, Japan. --

Signed and Sealed this

Twenty-second Day of August, 1989

Attest:

DONALD J. QUIGG

Attesting Officer

Commissioner of Patents and Trademarks